United States Patent [19]

Kotani et al.

[11] Patent Number: 4,719,886
[45] Date of Patent: Jan. 19, 1988

[54] INTERNAL COMBUSTION ENGINE SIAMESE PORT TYPE INTAKE SYSTEM CONSTRUCTION WITH DEFLECTION VALVE ADDITIONAL TO INTAKE CONTROL VALVE

[75] Inventors: Takeshi Kotani; Soichi Matsushita, both of Toyota, Japan

[73] Assignee: Toyota Jidosha Kabushiki Kaisha, Aichi, Japan

[21] Appl. No.: 927,045

[22] Filed: Nov. 4, 1986

[30] Foreign Application Priority Data

Nov. 8, 1985 [JP] Japan .............................. 60-250422

[51] Int. Cl.⁴ ............................................. F02B 15/00
[52] U.S. Cl. ..................................... 123/308; 123/442
[58] Field of Search ..................... 123/432, 308, 442

[56] References Cited

U.S. PATENT DOCUMENTS

| | | | |
|---|---|---|---|
| 4,378,000 | 3/1983 | Moriya | 123/442 |
| 4,550,699 | 11/1985 | Okumura et al. | 123/308 |
| 4,570,590 | 2/1986 | Kawai et al. | 123/308 |

FOREIGN PATENT DOCUMENTS

| | | | |
|---|---|---|---|
| 51920 | 4/1980 | Japan | 123/308 |
| 82523 | 5/1984 | Japan | 123/308 |

Primary Examiner—E. Rollins Cross
Attorney, Agent, or Firm—Kenyon & Kenyon

[57] ABSTRACT

An intake system construction for an internal combustion engine having a generally straight first intake port, a generally helical second intake port, both intake ports opening to one combustion chamber, and a common intake passage for supplying fuel-air mixture to the two intake ports. A control valve is fitted in the first intake port for selectively throttling the first intake port at low load operation of the engine, and a deflection valve is fitted in the commmon intake passage for selectively constricting intake flow through the common intake passage to deflect the flow toward the second intake port and away from the first intake port at low load operation of the engine, so that fuel accumulation on the cotrol valve closed at low load operation of the engine is avoided.

6 Claims, 7 Drawing Figures

INTERNAL COMBUSTION ENGINE SIAMESE PORT TYPE INTAKE SYSTEM CONSTRUCTION WITH DEFLECTION VALVE ADDITIONAL TO INTAKE CONTROL VALVE

BACKGROUND OF THE INVENTION

The present invention relates to a siamese type intake passage structure for an internal combustion engine air - fuel mixture intake system, and more particularly relates to such a siamesed type intake passage structure for an internal combustion engine intake system, said internal combustion engine incorporating two intake valves and thus being of the three valve type or the four valve type, wherein there are provided both an intake control valve construction for selectively supplying intake air - fuel mixture to said two intake valves in varying proportions, and also a deflection valve construction in addition to said intake control valve construction.

The present invention has been described in Japanese Patent Application Ser. No. 60-2504222 (1985), filed by an applicant the same as the applicant or the entity assigned or owed duty of assignment of the present patent application; and the present patent application hereby incorporates into itself by reference the text of said Japanese Patent Application and the claim and the drawings thereof; a copy is appended to the present application.

Further, the present inventors wish hereby to attract the attention of the examining authorities to copending patent applications Ser. Nos. 869,890 (now U.S. Pat. No. 4,699,104), 887,658 (now U.S. Pat. No. 4,699,434) and 895,379 (now U.S. Pat. No. 4,671,233), which may be considered to be material to the examination of the present patent application.

In the prior art, there have been proposed various types of intake passage structures for internal combustion engine cylinder heads and intake systems, and in particular for so called siamese type cylinder heads. In Japanese Utility Model Laying Open Publications Ser. Nos. 57-2215 (1982) and 59-123627 (1984), neither of which is it intended hereby to admit as prior art to the present application except to the extent in any case required by applicable law, there is disclosed an internal combustion engine with a so called double or siamesed type intake passage construction, incorporating a generally straight intake passage and a generally helical intake passage arranged in parallel with said generally straight intake passage, so that both said generally straight intake passage and also said generally helical intake passage receive supply of intake air-fuel mixture from the engine intake manifold, with a control valve selectively at least partially interrupting the flow of air-fuel mixture through said straight intake passage, so as selectively to provide extra swirl for the intake air-fuel mixture being sucked into the combustion chamber of the engine, so as to improve the misting of the fuel and in order to increase the intake air-fuel mixture flow speed, thereby to improve the fuel combustibility, the flame front propagation speed, and the firing efficiency, and thereby to militate against engine knocking, thereby to allow the engine to be operated with a weaker intake air-fuel mixture than would otherwise be practicable.

With such an intake passage structure for an internal combustion engine cylinder head and intake system, when the control valve is controlled to be in the closed state by a control system therefor, which is typically done when the current value of engine load is less than a certain determinate threshold value, substantially all of the air-fuel mixture sucked in by the combustion chamber of the engine is inhaled through the generally helical intake passage, and is accordingly imparted with strong swirling. Thus this mode of operation is appropriate for when the engine is operating at low load, as during the idling engine operating condition. In this condition, because of this swirling motion, the limit to which the air-fuel mixture being supplied to the engine can be weakened without engendering deleterious effects is extended. However, at this time the resistance presented to flow of air-fuel mixture by the generally helical intake passage by itself alone is high. On the other hand, when the control valve is controlled to be in the open state by the control system therefor, most of the air-fuel mixture sucked in by the combustion chamber of the engine is inhaled through the generally straight intake passage with only a minor proportion thereof being inhaled through the generally helical intake passage, and accordingly the inhaled air-fuel mixture as a whole is imparted with relatively weak swirling, thus accordingly causing the volumetric efficiency of the engine to be high so as to develop good engine power; this mode of operation is appropriate for when the engine is operating at high load, such as full load. At this time the resistance presented to flow of air-fuel mixture by the combination of the generally straight intake passage and the generally helical intake passage is relatively low.

There is however a problem with such an intake passage structure for an internal combustion engine cylinder head and intake system, in that, when the control valve is thus controlled to be in the closed state by its control system and substantially off of the air-fuel mixture sucked in by the combustion chamber of the engine is being inhaled through the generally helical intake passage and is accordingly being imparted with strong swirling, droplets of fuel tend to stick to the valve member of said control valve, thus causing the amount of fuel supplied to the internal combustion engine combustion chamber or chambers to vary on each engine cycle, so that, particularly when the air/fuel ratio of the overall air-fuel mixture being supplied to the combustion chamber or chambers is near the limit in the weakness direction, the fluctuations of combustion are increased, and thereby the drivability of the engine, and particularly its idling operation, are deteriorated.

When the intake passage control valve is thus in the closed condition, as stated above, the reason for such combustion fluctuations in every engine cycle is because the amount of fuel supplied varies unpredictably, due to droplets of fuel tending to stick to the valve member of said control valve, and these fuel droplets then tend to flow unpredictably and irregularly through the inevitable small gap remaining between the edge of said valve member of said intake passage control valve and the wall of the intake passage against which said valve member edge abuts, thereafter sticking to the wall of the intake passage and oozing in liquid form therealong downstream of the intake control valve, to be thereafter unpredictably and irregularly sucked off from said intake passage wall; at least, this situation is hypothesized by the present inventors.

Now, on the other hand, in Japanese Utility Model Laying Open Publication Ser. Nos. 60- 45829 (1985), which it is not intended, either, hereby to admit as prior art to the present patent application except to the extent in any case required by applicable law, there is disclosed an internal combustion engine, again with a so called double or siamesed type intake passage construction incorporating a generally straight intake passage and a generally helical intake passage arranged in parallel with said generally straight intake passage, so that (similarly to the previous case) both said generally straight intake passage and also said generally helical intake passage receive supply of air from the engine intake manifold, and with a control valve selectively at least partially interrupting the flow of air through said straight intake passage so as selectively to provide extra swirl for the intake air being sucked into the combustion chamber of the engine, but, in this case, with fuel being supplied by a fuel injector into the intake system downstream of said control valve. Thus, since the intake control valve is definitely not provided in the engine intake system downstream of the point at which fuel is supplied to said intake system, the possibility of droplets of fuel adhering to the valve member of said intake control valve and of corresponding increase in the amount of fuel adhering to the walls of the intake passage is of course completely precluded.

However, with this concept of providing the intake control valve upstream of the point at which fuel is supplied into the engine intake system, the problem arises that the effectiveness of the intake control valve for distributing the flow of intake air-fuel mixture between the generally straight intake passage and the generally helical intake passage is deteriorated, and in particular a limit is created to the extent by which air-fuel mixture intake to the combustion chamber or chambers of the engine can be provided only through the generally helical intake passage, and thus, even when the intake control valve is in its fully closed condition, quite a considerably proportion of intake air-fuel mixture inevitably is supplied to the generally straight intake passage. Accordingly in such circumstances, such as in low engine load or idling operational conditions, the swirling of air-fuel mixture within the combustion chamber or chambers is impaired, and the misting of the fuel and also the intake air-fuel mixture flow speed are deteriorated, thereby deteriorating the fuel combustibility, the flame front propagation speed, and the firing efficiency, thus engendering a risk of engine knocking, and preventing the engine from being operated with as weak an intake air-fuel mixture as would otherwise be practicable.

Also, as a subsidiary desideratum for such a siamese type intake passage structure for such an internal combustion engine cylinder head, it is important that, especially during transient driving conditions, the fuel supply responsiveness of the engine should be as good as possible; and this, too, relates to the question of fuel droplets adhering to the walls of the intake passage, as detailed above.

SUMMARY OF THE INVENTION

The inventors of the present invention have considered the various problems detailed above in the case when an intake passage control valve is provided for controlling the distribution of air - fuel mixture between a generally straight intake passage and a generally helical intake passage of the engine, from the point of view of the desirability of preventing droplets of liquid fuel adhering to the valve member of such an intake control valve.

Accordingly, it is the primary object of the present invention to provide an intake system construction for an internal combustion engine, which avoids the problems detailed above.

It is a further object of the present invention to provide such a variable swirl siamese port type construction for an internal combustion engine intake system, which prevents droplets of liquid fuel from adhering to the valve member of such an intake passage control valve.

It is a further object of the present invention to provide such a variable swirl siamese port type construction for an internal combustion engine intake system, which prevents uneven operation of the engine.

It is a further object of the present invention to provide such a variable swirl siamese port type construction for an internal combustion engine intake system, which prevents the occurrence of fluctuations in the amount of fuel provided in each engine cycle to the engine combustion chamber or chambers.

It is a further object of the present invention to provide such a variable swirl siamese port type construction for an internal combustion engine intake system, which prevents fluctuations in fuel combustibility.

It is a further object of the present invention to provide such a variable swirl siamese port type construction for an internal combustion engine intake system,- which keeps engine drivability high.

It is a further object of the present invention to provide such a variable swirl siamese port type construction for an internal combustion engine intake system, which has good characteristics with regard to transient responsiveness of the engine, especially responsiveness in accelerating away from a low load condition such as the idling condition.

It is a further object of the present invention to provide such a variable swirl siamese port type construction for an internal combustion engine intake system, which allows engine output power to be enhanced.

It is a further object of the present invention to provide such a variable swirl siamese port type construction for an internal combustion engine intake system, which allows engine mechanical octane value to be enhanced.

It is a further object of the present invention to provide such a variable swirl siamese port type construction for an internal combustion engine intake system, which provides good ignition characteristics for the engine.

It is a further object of the present invention to provide such a variable swirl siamese port type construction for an internal combustion engine intake system, which allows the engine to be operated with a very weak mixture.

It is a further object of the present invention to provide such a variable swirl siamese port type construction for an internal combustion engine intake system, which allows for reduction of the flame propagation distance in the engine combustion chamber or chambers.

It is a yet further object of the present invention to provide such a variable swirl siamese port type construction for an internal combustion engine intake system, which allows for increase of the flame propagation speed in the engine combustion chamber or chambers.

It is a yet further object of the present invention to provide such a variable swirl siamese port type construction for an internal combustion engine intake system, which has good characteristics with regard to engine volumetric efficiency.

It is a yet further object of the present invention to provide such a variable swirl siamese port type construction for an internal combustion engine intake system, which provides good microturbulence in the combustion chambers of the engine.

It is a yet further object of the present invention to provide such a variable swirl siamese port type construction for an internal combustion engine intake system, which provides supply of air-fuel mixture of relatively uniform air/fuel ratio to the combustion chambers of the engine.

According to the most general aspect of the present invention, these and other objects are attained by a intake system construction for an internal combustion engine formed with a combustion chamber, comprising: a first generally straight intake passage which leads to a first intake port opening to said combustion chamber; a second generally helical intake passage which leads to a second intake port, also opening to said combustion chamber, formed with a generally helical end vortex portion; a common intake passage leading to the upstream ends of said first generally straight intake passage and of said second genreally helical intake passage; a control valve fitted in said first generally straight intake passage so as to control its flow resistance; and: a deflection valve fitted in said common intake passage so as, when in its closed condition, to constrict flow through said common intake passage and to deflect it towards said second generally helical intake passage and away from said first generally straight intake passage.

According to such a system as specified above, since the deflection valve is provided upstream of the control valve, when this deflection valve is in the closed position, gas flow (either air flow or air-fuel mixture flow) is already deflected towards said second generally helical intake passage where no control valve is particularly provided, and away from said first generally straight intake passage containing the control valve; and accordingly the fuel also is directed mainly to said second generally helical intake passage; and, when the intake gas flows through the constriction in the common intake passage provided by this deflection valve, the flow speed of said gas is increased, and thereby misting of the fuel is encouraged, and the amount of the fuel adhering in liquid droplets to the surface of the valve element of the control valve when it is closed is reduced, and accordingly the fluctuation between engine cycles of the amount of fuel supplied to the combustion chamber is much reduced. Thereby, combustion fluctuation is reduced, and the range of weak combustion is much increased.

According to a particular specialization of the present invention, this intake system construction may further comprise a fuel injection valve fitted downstream of said deflection valve. In this case, there will be one such fuel injector provided for each of the cylinders of the internal combustion engine, and the gas flow past the deflection valve will be only air. Thus, when the deflection valve is in the closed position, the air flow past said deflection valve through the common intake passage will be restricted and will be deflected towards the second generally helical intake passage, and will influence the mist of fuel supplied by the fuel injector and will deflect said fuel mist towards said second generally helical intake passage, thus reducing the amount of fuel mist passing towards the first generally straight intake passage containing the control valve. Also, the flow rate of the air flow past said deflection valve through the common intake passage will be increased, thus improving the misting of the fuel injected to this air flow. Thereby, when the control valve is closed, the amount of fuel droplets which stick to said control valve is reduced, and accordingly fuel supply fluctuation is restricted and engine stability is improved.

According to an alternative particular specialization of the present invention, the first above intake system construction may further comprise a fuel injection valve fitted upstream of said deflection valve. In this case, there will be only one common such fuel injector provided for all of the cylinders of the internal combustion engine, i.e. a so called single point fuel injector, and the gas flow past the deflection valve will be a flow of air-fuel mixture. Thus, when the deflection valve is in the closed position, the air-fuel mixture flow past said deflection valve through the common intake passage will be restricted and will be deflected towards the second generally helical intake passage, thus reducing the amount of fuel mist passing towards the first generally straight intake passage containing the control valve. Also, the flow rate of the air-fuel mixture flow past said deflection valve through the common intake passage will be increased, thus improving the misting of the fuel in this air-fuel mixture flow. Thereby, when the control valve is closed, the amount of fuel droplets which stick to said control valve is reduced, and accordingly fuel supply fluctuation is restricted and engine stability is improved. In this case, some droplets of liquid fuel may stick to the surface of the valve element of the deflection valve; but, even when these fuel droplets pass through the small gap defined between said valve element of said deflection valve and the intake passage side wall cooperating therewith, since downstream of this there is provided the control valve, there is no direct way in which said fuel droplets can enter the engine combustion chamber, and therefore no substantial increase occurs in the cycle by cycle fluctuation of the fuel supply to said combustion chamber.

Basically it is considered to be preferable for the control valve and the deflection valve to be operated together during low speed driving or low load driving to use inlet swirling so as to go close to the weak mixture combustion limit with a relatively large air to fuel ratio; while, in the mid speed or the mid load range, it is thought best for the control valve to be closed so as to generate swirling and for the deflection valve to be opened so as to ensure the necessary intake flow amount according to reduced intake system flow resistance. In this case there is a danger of more fuel droplets sticking to the control valve surface, but compared with case where both valves are closed a relatively rich mixture is being supplied to the combustion chamber, so, since not such an extreme weak mixture combustion situation is prevailing, even if the fuel amount supplied to the combustion chamber fluctuates somewhat every engine cycle according to irregular increase and decrease in the amount of the adhered fuel droplets that are sucked off, not much loss of vehicle drivability is caused. Further, it is considered to be desirable, in the high speed or high load operational range, in order to get an even higher intake air flow rate, to open both the deflection valve and the control valve.

According to a more particular specialization of the present invention, the edge of said deflection valve on the side of said second generally helical intake passage, when said deflection valve is in its closed condition, may leave a relatively small gap between itself and the edge of said common intake passage on the side of said second generally helical intake passage. Or, according to an alternative more particular specialization of the present invention, the edge of said deflection valve on the side of said second generally helical intake passage, when said deflection valve is in its closed condition, may substantially abut against the edge of said common intake passage on the side of said second generally helical intake passage, said edge being formed with a cutaway portion. Or, according to yet another more particular specialization of the present invention, the edge of said deflection valve on the side of said second generally helical intake passage, when said deflection valve is in its closed condition, may substantially abut against the edge of said common intake passage on the side of said second generally helical intake passage, said deflection valve being formed with a throughhole near said edge thereof. Either one of these constructions may be deemed appropriate, depending upon circumstances.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustration of the relevant parts, unless otherwise specified; like reference numerals, unless otherwise so specified denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

The present invention will now be described with reference to the preferred embodiments thereof, and with reference to the figures.

THE FIRST PREFERRED EMBODIMENT

Figure 1:
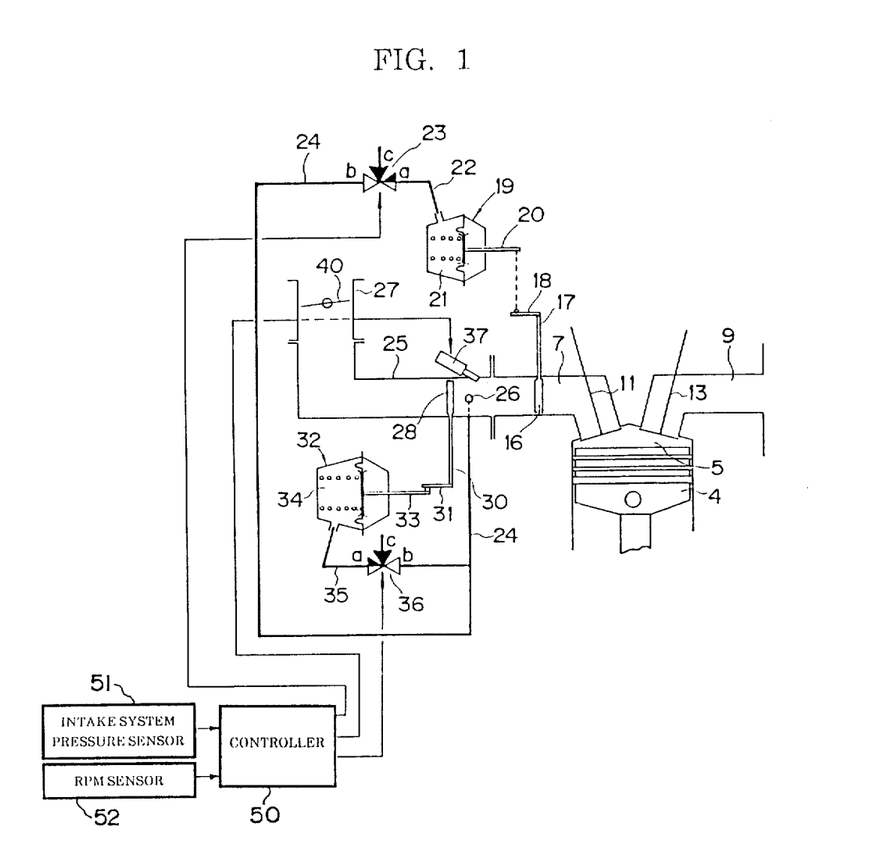
FIG. 1 is a schematic skeleton diagram showing important parts of the first preferred embodiment of the intake system construction of the present invention.
Figure 2:
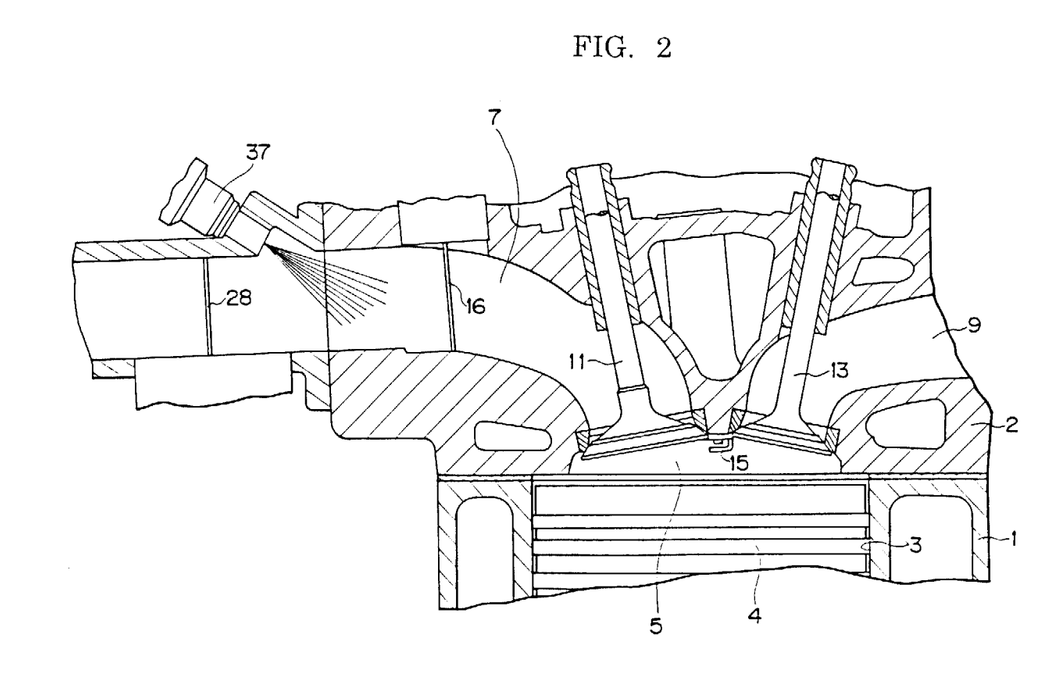
FIG. 2 is an axial longitudinal sectional view, showing an internal combustion engine cylinder bore, a piston slidably fitted in said cylinder bore, and a portion of a cylinder head and of an intake passage of an internal combustion engine incorporating the first preferred embodiment of the intake system construction of the present invention, this sectional view being taken in a somewhat distorted plane generally containing the central axis of said cylinder bore but somewhat staggered to and fro.

FIGS. 1 through 5 relate to the first preferred embodiment of the intake system construction of the present invention. Construction In the first preferred embodiment of the intake system construction of the present invention, shown in schematic view in FIG. 1, in longitudinal sectional view in FIG. 2, and in transverse sectional view in FIG. 3, the reference numeral 1 denotes the cylinder block of the engine, while on this cylinder block 1 there is fitted a cylinder head, denoted by the reference numeral 2. The cylinder block 1 is formed with a plurality of cylinder bores 3 of which only one is shown in FIG. 2 because the section of FIG. 2 is taken in a plane including the central longitudinal axis of said shown cylinder bore 3 and substantially perpendicular to the plane including the central longitudinal axes of all said cylinder bores 3. In this cylinder bore 3 there reciprocates a piston 4, and between said piston 4, said cylinder head 2, and the upper portion of said cylinder bore 3 there is defined a combustion chamber 5 for this piston and cylinder. And the fitting of the cylinder head 2 to the cylinder block 1 is done by the use of cylinder head bolts, not particularly shown, fitted through cylinder head bolt holes formed in bosses, not particularly shown, formed in the cylinder head 2 between each pair of adjacent cylinders and at the ends of the row of cylinders.

Figure 3:
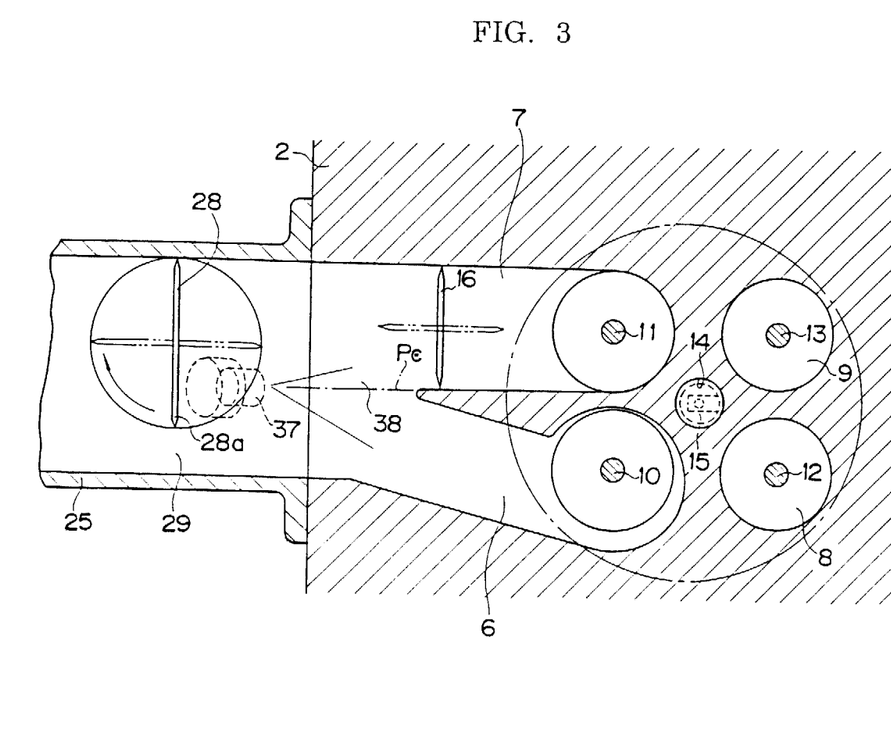
FIG. 3 is a transverse sectional view taken through said cylinder head and said intake passage of said internal combustion engine incorporating said first preferred embodiment of the intake system construction of the present invention, as seen from underneath the cylinder head looking upwards, the sectional plane of this drawing being also somewhat distorted.
Figure 4:
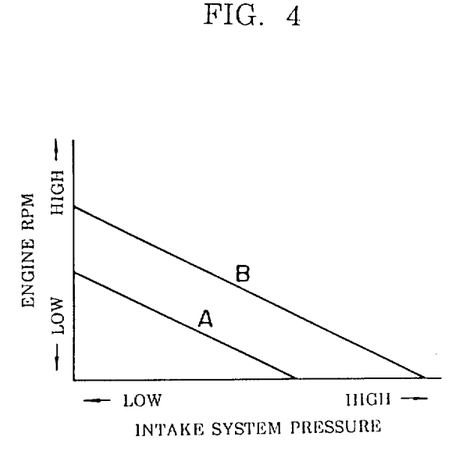
FIG. 4 is a phase space diagram for explanation of the operation of said first preferred embodiment of the present invention, in which intake system pressure is shown along the horizontal axis and engine rotational speed is shown along the vertical axis.

For each cylinder, the cylinder head 2 is formed with two intake ports 6 and 7 and two exhaust ports 8 and 9, all four of which which open via respective valve seats to the combustion chamber 5, with the centers of said four valve seats approximately at the corners of a square, as generally shown in FIG. 3. Thus, this internal combustion engine is of the four valve per cylinder type. And the intake ports 6 and 7 for each of the cylinders of this engine are arranged on the one side of the cylinder block 1 and the cylinder head 2, in the longitudinal direction of said cylinder head 2 along the row of cylinders thereof (which corresponds to the direction perpendicular to the drawing paper in FIG. 2 and to the vertical direction in FIG. 3); and, similarly, the exhaust ports 8 and 9 for each of the various cylinders are arranged on the other side to said one side of the cylinder block 1 and of the cylinder head 2. Poppet valves 10 and 11 of a per se known type, only one of which can be seen in the sectional view of FIG. 2, and mounted in per se known valve guides fitted in the cylinder head 2, are provided for cooperating with intake valve seats inset around the edges of each of the intake ports 6 and 7 where they open to the combustion chamber 5, so as to provide open/close control of communication between said intake ports 6 and 7 and the combustion chamber 5; and two other poppet valves 12 and 13, also per se known and mounted in per se known valve guides fitted in the cylinder head 2, and again only one of which can be seen in FIG. 2, are provided for similarly cooperating with exhaust valve seats inset around the edges of the exhaust ports 8 and 9 where they open to the combustion chamber 5, so as similarly to provide open/close control of communication between the communication between said exhaust ports 8 and 9 and said combustion chamber 5. And by actuation of these intake poppet valves 10 and 11 and these exhaust poppet valves 12 and 13 by a per se known type of valve gear not particularly shown, the internal combustion engine is caused to operate according to an Otto cycle so as to generate rotational power, as is per se conventional. And, as best seen in FIG. 4, substantially in the middle of the portion of the cylinder head 2 defining the roof of the combustion chamber 5 there is formed a screwed hole 14 for fitting a spark plug 15 thereinto.

In more detail, the cylinder head 2 is formed with an intake plenum 38 opening at its outside left side as seen in the figures, and this intake plenum 38 branches into the two intake ports 6 and 7. The intake port 7 is formed as a generally straight intake passage, while the other intake port 6 is formed as a generally helical intake passage. Referring particularly to Fig. 1, a flow of air is sucked into the combustion chamber 5 of the engine through a throttle body 27 equipped with a throttle valve 40 (controlled by the operation of a vehicle throttle pedal, not particularly shown) and thence through an intake manifold 25 which is fitted between the throttle body 27 and the cylinder head 2 and is formed with an intake passage abutted against the intake plenum 38 so as to be communicated therewith. This flow of air first enters the cylinder head 2 into the intake plenum 38 upstream of the two intake ports 6 and 7, and then is divided by impinging upon the upstream edge of a dividing wall which separates said two intake ports 6 and 7, so that part of said air flow enters into the upstream end of the generally straight intake port 7 while the remainder of said air flow enters into the upstream end of the generally helical intake port 6. The generally straight intake port 7 debouches into the combustion chamber 5 through the valve seat controlled by the intake poppet valve 11, while the generally helical intake port 6 debouches into the combustion chamber 5 through the valve seat controlled by the other intake poppet valve 10. Thus, the lower side as seen in the view of FIG. 3 of the downstream portion of the air-fuel mixture intake system defines the generally helical mixture intake port 6, so that air-fuel mixture flowing through this generally helical intake port 6, when the intake poppet valve 10 is opened of course, impinges against a vortex portion formed around the stem of said intake poppet valve 10 is said helical port 6 and is imparted with substantial swirling motion.

In the upstream end or intake end of the generally straight intake port 7, just downstream of where said generally straight intake port 7 branches off from the intake plenum 38, there is provided a butterfly type air-fuel mixture intake control vavle 16, which is fixedly mounted on a shaft designated in FIG. 1 as 17 and is selectively positioned via said shaft 17 by an actuating device which will be explained shortly to either one of a closed position as shown in FIGS. 2 and 3 in which said air-fuel mixture intake control valve 16 substantially closes said upstream end of said generally straight intake port 7 while of course leaving uninterfered with said generally helical intake port 6, or an open position, angularly spaced approximately 90° from said shown closed position, in which said air-fuel mixture intake control valve 16 substantially leaves said upstream end of said generally straight intake port 7 open and uninterfered with.

The air-fuel mixture intake control valve 16 is rotationally driven, via its drive shaft 17 and a drive lever 18, by a drive rod 20 of a diaphragm device 19, thus being closed to its position as shown by the solid lines in FIG. 3 when actuating vacuum (or depression) greater than a certain threshold vacuum value is supplied to a diaphragm chamber 21 of said diaphragm device 19, while on the other hand being opened to its position as shown by the phantom lines in FIG. 3 when actuating vacuum (or depression) greater than said certain threshold vacumm value is not supplied to said diaphragm chamber 21 of said diaphragm device 19.

This diaphragm chamber 21 of the diaphragm device 19 is connected by a vacuum line 22 to a port designated as "a" of an electrically controlled vacuum switching valve 23. This electrically controlled vacuum switching valve 23 has three ports, designated as "a", "b", and "c", and is constructed so as, when a solenoid or the like thereof not particularly shown is supplied with actuating electrical energy from a controller 50 as will be explained shortly, to connect its said port "a" to its said port "c" while not connecting its said port "b" to any other port; while, on the other hand, when its said solenoid or the like not particularly shown is not thus supplied with actuating electrical energy from said controller 50, it connects its said port "a" to its said port "b" while not connecting its said port "c" to any other port. The port "b" of said electrically controlled vacuum switching valve 23 is connected by a vacuum conduit 24 to a vacuum take out port 26 provided in the intake manifold 25 downstream of the throttle valve 40, and is thus supplied with a constant supply of vacuum (intake manifold depression), while the port "c" of said electrically controlled vacuum switching valve 23 is communicated to a supply of atmospheric pressure.

In the intake manifold 25, near its downstream end which is connected to the intake plenum 38 of the cylinder head 2, there is provided an intake passage deflection valve 28, which is a butterfly type valve whose valve element is fixedly mounted on a shaft 30 whose rotational axis somewhat displaced towards the side of the generally straight intake port 7 from the side of the generally helical intake port 6 and from the line designated as "Pc" of the dividing wall between said generally straight intake port 7 and said generally helical intake port 6, as best shown in the FIG. 3 view. This intake passage deflection valve 28 is formed with an edge 28a on its side towards the generally helical intake port 6, i.e. on its side towards the center of the intake port structure. And, as shown in FIG. 3, when the intake passage deflection valve 28 is selectively positioned via its shaft 30 by the actuating device therefor which will be described shortly to its closed position in which said valve 28 substantially obstructs the lower end portion of the intake passage formed in the intake manifold 25, as shown by the solid lines in FIG. 3, then the edge 28a thereof is positioned on the side of the generally helical intake port 6 from said line designated as "Pc" of the dividing wall between the generally straight intake port 7 and said generally helical intake port 6. In this closed position of the intake passage deflection valve 28, air flowing through the intake passage formed in the intake manifold 25 can only pass past this intake passage deflection valve 28 through a relatively narrow opening 29 left between this edge 28a of said valve 28 and the wall of the intake manifold 25 on the side of the generally helical intake port 6. On the other hand, when said intake passage deflection valve 28 is in its open position at approximately 90° from its said closed position, as shown by the phantom lines in FIG. 3, then it allows substantially free open and uninterfered with flow of air through the intake passage defined in the intake manifold 25.

This intake passage deflection valve 2 is rotationally driven, via its drive shaft 30 and a drive lever 31, by a drive rod 33 of a diaphragm device 32, thus being closed to its position as shown by the solid lines in FIG. 3 when actuating vacuum (or depression) greater than another certain threshold vacuum value is supplied to a diaphragm chamber 34 of said diaphragm device 32, while on the other hand being opened to its position as shown by the phanton lines in FIG. 3 when actuating vacuum (or depression) greater than said certain threshold vacuum value is not supplied to said diaphragm chamber 34 of said diaphragm device 32.

This diaphragm chamber 34 of the diaphragm device 32 is connected by a vacuum line 35 to a port designated as "a" of another electrically controlled vacuum switching valve 36. This electrically controlled vacuum switching valve 36, like the electrically controlled vacuum switching valve 23, has three ports, designated as "a", "b", and "c", and is similarly constructed so as, when a solenoid or the like thereof not particularly shown is supplied with actuating electrical energy from the controller 50 as will be explained shortly, to connect its said port "a" to its said port "c" while not connecting its said port "b" to any other port; while, on the other hand, when its said solenoid or the like not particularly shown is not thus supplied with actuating electrical energy from said controller 50, it connects its said port "a" to its said port "b" while not connecting its said port "c" to any other port. The port "b" of said electrically controlled vacuum switching valve 36 is connected via the vacuum conduit 24 to the aforementioned vacuum take out port 26 provided win the intake manifold downstream of the throttle valve 40, and is thus supplied with a constant supply of vacuum (intake manifold depression), while the port "c" of said electrically controlled vacuum switching valve 36 is communicated to a supply of atmospheric pressure.

Near the downstream end of the intake passage defined in the intake manifold 25, downstream of the intake passage deflection valve 28 therein, there is fitted a fuel injector 37; in fact one of these fuel injectors 37 is provided for each engine cylinder although this matter is not particularly shown in the figures. This fuel injector 37 is provided substantially on said line designated as "Pc" of the dividing wall between the generally straight intake port 7 and the generally helical intake port 6, as shown in the FIG. 3 view, and injects fuel such as gasoline in the form of liquid mist into the intake plenum 38 with a certain mist spreading angle. The volume of each spurt of fuel injection is determined by the opening time interval of the fuel injector 37, which is determined according to an electrical control signal outputted by the controller 50.

In more detail, this controller 50, which typically and preferably but not compulsorily may include a microcomputer, receives input signals from, among other possible sensors, an intake system pressure sensor 51 and an engine rotational speed sensor 52. The intake system pressure sensor 51 senses the pressure in the intake manifold 25 and outputs an electrical signal representative thereof, while the engine rotational speed sensor 52 senses the current value of the rotational speed of this internal combustion engine and outputs an electrical signal representative thereof.

Operation

This first preferred embodiment of the intake port structure of the present invention operates as will be described hereinafter, according to a program stored in the microcomputer portion of the controller 50 which will not be particularly described herein in detail because the details thereof can be easily supplemented by one of ordinary skill in the programming art based upon the functional disclosures set out in this specification. In this first preferred embodiment, the operation of the controller is determined according to the current value of the pressure in the intake manifold 25 as sensed by the intake system pressure sensor 51 and according to the current value of the rotational speed of this internal combustion engine as sensed by the engine rotational speed sensor 52, and discussion thereof will accordingly be made with reference to FIG. 4, which is a phase space diagram in which said intake system pressure is shown along the horizontal axis and said engine rotational speed is shown along the vertical axis.

In the low engine rotational speed low engine load area on the side of the origin in FIG. 4 of the line "A", the controller 50 does not supply actuating electrical energy either to the solenoid (or the like) of the electrically controlled vacuum switching valve 23 or to the solenoid (or the like) of the electrically controlled vacuum switching valve 36, so that both the air - fuel mixture intake control valve 16 and also the intake passage deflection valve 28 are set to their closed positions as shown by the solid lines in FIG. 3, thus causing flow of air-fuel mixture through the generally straight intake port 7 to be interrupted, so that substantially all of the air-fuel mixture flow inhaled by the combustion chamber 5 enters into the upstream end of the generally helical intake port 6, and passes through the intake valve port controlled by the intake poppet valve 10 into the combustion chamber 5 with a substantial amount of swirling being imparted to said sucked in air-fuel mixture as it enters said combustion chamber 5 by the vortex portion formed around the stem of said intake poppet valve 10; this swirling is in the counterclockwise direction as seen from the point of view of FIG. 3 around the central axis of the cylinder bore 3. The flow resistance of the intake system is now very high, due to the fact that the intake passage deflection valve 28 is in its closed position. Also, the controller 50 determines the signal sent to the fuel injector 37 so as to provide an extremely weak air-fuel mixture in the intake plenum 38, with an air/fuel ratio close to the limit in the weak direction for proper combustion.

Next, in the medium engine rotational speed medium engine load area on the side away from the origin in FIG. 4 of the line "A" and between said line "A" and the line "B", the controller 50 does not supply actuating electrical energy to the solenoid (or the like) of the electrically controlled vacuum switching valve 23, but on the other hand does supply actuating electrical energy to the solenoid (or the like) of the electrically controlled vacuum switching valve 36, so that the air-fuel mixture intake control valve 16 is set to its closed position as shown by the solid line in FIG. 3 while on the other hand the intake passage deflection valve 28 is set to its open position as shown by the phantom line in said figure, thus causing flow of air-fuel mixture through the generally sraight intake port 7 still to be interrupted, so that substantially all of the air-fuel mixture flow inhaled by the combustion chamber 5 still enters into the upstream end of the generally helical intake port 6 and passes through the intake valve port 10 controlled by the intake poppet valve 10 into the combustion chamber 5 with a substantial amount of swirling being imparted to said sucked in air-fuel mixture as it enters said combustion chamber 5 by the vortex portion formed around the stem of said intake poppet valve 10. Now, however, the flow resistance of the intake system is substantially reduced and also the swirling induced therein is reduced, due to the fact that the intake passage deflection valve 28 is not in its opened position. Also, the controller 50 now determines the signal sent to the fuel injector 37 so as to provide a somewhat richer air-fuel mixture in the intake plenum 38.

Finally, in the high engine rotational speed high engine load area on the side away from the origin in FIG. 4 of the line "B", the controller 50 supplied actuating electrical energy to the solenoid (or the like) of the electrically controlled vacuum switching valve 23 and also to the solenoid (or the like) of the electrically controlled vacuum switching valve 36, so that the air-fuel mixture intake control valve 16 and also the intake passage deflection valve 28 are both set to their open positions as shown by the phantom lines in FIG. 3, thus causing flow of air-fuel mixture through the generally straight intake port 7 to be now allowed, so that most of the air-fuel mixture flow inhaled by the combustion chamber 5 now enters into the combustion chamber 5 through the generally straight intake port 7, with only a minor amount passing through the generally helical intake port 6. Accordingly, only a relatively low amount of swirling as a whole is imparted to said sucked in air-fuel mixture as it enters said combustion chamber 5 by the vortex portion formed around the stem of the intake poppet valve 10. Thus, good volumetric efficiency for the engine is obtained, and high power output can be attained. And, in this operational condition, the flow resistance of the intake system is at its minimum and also the swirling induced therein is at its minimum, due to the fact that the intake passage deflection valve 28 and also the air-fuel mixture intake control valve 16 are now in their opened positions. Also, the controller 50 now determines the signal sent to the fuel injector 37 so as to provide a substantially stoichiometric air-fuel mixture in the intake plenum 38, by determining the fuel injection amount according to the engine rotational speed and according to the intake manifold vacuum in a per se known manner.

Therefore, in low speed low load vehicle operational conditions, the air-fuel mixture intake control valve 16 and the intake passage deflection valve 28 are both in their closed positions, and the intake air flows through the constricted opening 29 defined by the intake passage deflection valve 28 in its said closed position, and the thus caused throttling effect causes deflection of the air stream towards the generally helical port 6. Under the influence of this intake air flow, i.e. the aspiration effort of this air flow, the mist of fuel injected by the fuel injector 37 into the plenum 38 is displaced towards the generally helical port 6, and thereby the majority of the air-fuel mixture flow goes straight into the generally helical port 6, and moreover because of the speeded up flow of air caused by the constriction 29 in the region of the fuel injection spray, the misting of the injected fuel is encouraged and the sticking of fuel droplets to the closed air-fuel mixture intake control valve 16 is much reduced in quantity, and accordingly the cycle by cycle fluctuation of the fuel amount supplied to the combustion chamber 5 when the air-fuel mixture intake control valve 16 is closed is reduced, and stability of the engine under weak mixture running is thereby significanly improved.

And, in medium speed, medium load vehicle operational conditions, the intake passage deflection valve 28 is opened in order to reduce the intake system flow resistance, so as to ensure the necessary amount of intake air flow. At the same time the air-fuel mixture intake control valve 16 is maintained as closed, in order to ensure the generation of swirl.

On the other hand, during high speed high load vehicle operational conditions, in order to ensure an even greater intake air-fuel mixture flow amount, both the air-fuel mixture intake control valve 16 and the intake passage deflection valve 28 are opened, and the swirl amount is accordingly minimized.

THE SECOND PREFERRED EMBODIMENT

Figure 5:
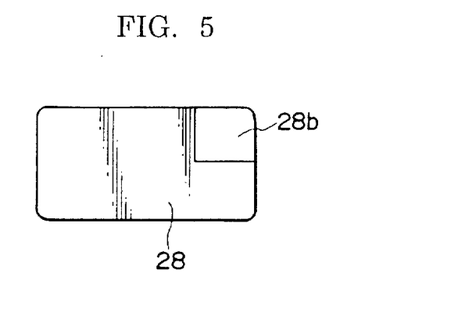
FIG. 5 shows a valve member of an intake passage deflection valve of the second preferred embodiment of the intake system construction of the present invention.

The valve member of the intake passage deflection valve 28 of the second preferred embodiment of the intake system construction of the present invention is shown in FIG. 5. This valve member, when the intake passage deflection valve 28 is in its closed position, abuts against the wall of the intake manifold 25 on the side of the generally helical intake port 6, rather than defining a gap such as the gap 29 of the first preferred embodiment. The function of said gap 29 of said first preferred embodiment is instead performed by a cutaway 28b formed in this edge of the valve member of the intake passage deflection valve 28. The same functions and advantages are available with this second preferred embodiment of the intake system construction of the present invention, as were available with the first preferred embodiment, and accordingly detailed description thereof will be eschewed in the interests of brevity of explanation.

THE THIRD PREFERRED EMBODIMENT

Figure 6:
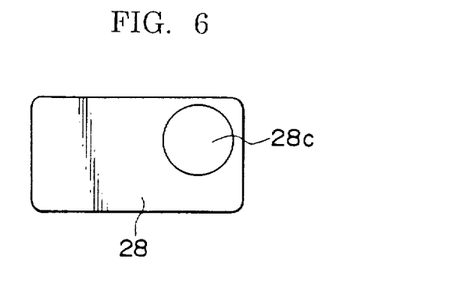
FIG. 6, similarly to FIG. 5 for said second preferred embodiment, shows a valve member of an intake passage deflection valve of the third preferred embodiment of the intake system construction of the present invention.

The valve member of the intake passage deflection valve 28 of the third preferred embodiment of the intake system construction of the present invention is shown in FIG. 6, in a similar manner to FIG. 5 for the second preferred embodiment. This valve member, when the intake passage deflection valve 28 is in its closed position, again abuts against the wall of the intake manifold 25 on the side of the generally helical intake port 6, rather than defining a gap such as the gap 29 of the first preferred embodiment. The function of said gap 29 of said first preferred embodiment is instead in this third preferred embodiment performed by a hole 29c formed near this edge of the valve member of the intake passage deflection valve 28, through said valve member. The same functions and advantages are available with this third preferred embodiment of the intake system construction of the present invention, as were available with the first and the second preferred embodiments, and accordingly detailed description thereof will be again foregone.

THE FOURTH PREFERRED EMBODIMENT

Figure 7:
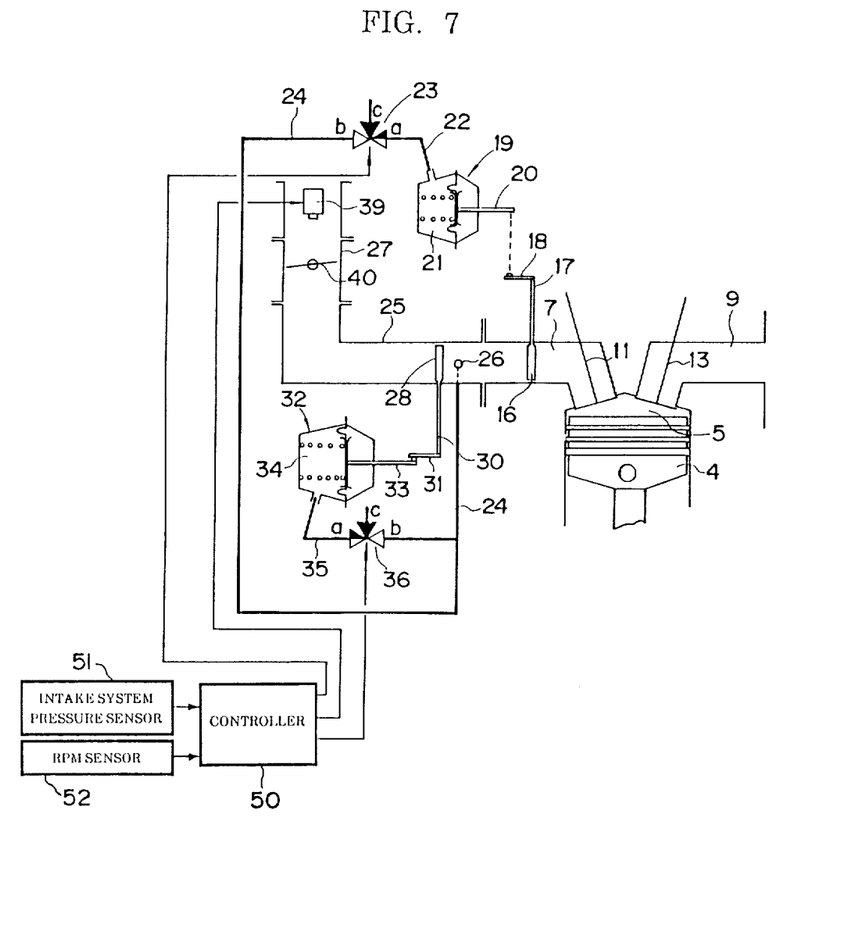
FIG. 7, similarly to FIG. 1 for the first preferred embodiment, is a schematic skeleton diagram showing important parts of the intake system construction according to the fourth preferred embodiment of the present invention.

The fourth preferred embodiment of the intake system construction of the present invention is shown in FIG. 7, in a schematic view similar to FIG. 1 which is related to the first preferred embodiment. In this figure, parts and gaps and spaces and so on which correspond to analogous parts and gaps and spaces and so on of the first preferred embodiment are denoted by reference numerals like to those utilized in the figures relating to said first preferred embodiment.

In this fourth preferred embodiment, the difference is that, rather than a separate fuel injector (such as the fuel injector 37 of the first preferred embodiment) being provided for each of the engine cylinders downstream of the intake passage deflection valve 28, instead a single point fuel injector 39 is provided upstream of the throttle body 39 and the throttle valve 40, i.e. upstream of the intake manifold 25. Thus, in this fourth preferred embodiment, it is air-fuel mixture which is flowing past the intake passage deflection valve 28, rather than only intake air as in the case of the first preferred embodiment. However, similar functions and advantages are available with this fourth preferred embodiment of the intake system construction of the present invention, as were available with the first through the third preferred embodiments; because the injector 39 is upstream of the intake passage deflection valve 28, when said intake passage deflection valve 28 is open, the air-fuel mixture flows past said intake passage deflection valve 28 towards the combustion chamber 5 without substantial interference with its flow, while, on the other hand, when said intake passage deflection valve 28 is closed, the air-fuel mixture flows past said intake passage deflection valve 28 while being deflected towards the generally helical port 6. Thus the amount of fuel in liquid droplet form sticking to the air-fuel mixture intake control valve 16 is reduced, in these engine operational circumstances, and in this case also engine running stability in weak mixture operational conditions is improved.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. An intake system construction for an internal combustion engine formed with a combustion chamber, comprising:
   - a generally straight first intake port opening to said combustion chamber;
   - a generally helical second intake port also opening to said combustion chamber;
   - a common intake passage leading to upstram end of said first and said second intake port;
   - a control valve fitted in said first intake port so as selectively to throttle said first intake port; and
   - a deflection valve fitted in said common intake passage so as selectively to constrict a part of a cross sectional opening of said common intake passage and to deflect intake flow therethrough towards said second intake port and away from said first intake port.

2. An intake system construction for an internal combustion engine according to claim 1, wherein said deflection valve is a butterfly type valve fitted in said common intake passage as biased toward one side thereof as viewed in a cross section thereof so that said deflection valve leaves, in a fully closed condition thereof, a substantial free passage opening in said common intake passage only on one side thereof.

3. An intake system construction for an internal combustion engine according to claim 1, wherein said deflection valve is a butterfly type valve formed with a cutaway portion at one free edge portion thereof.

4. An intake sytem construction for an internal combustion engine according to claim 1, wherein said deflection valve is a butterfly type valve formed with a through hole near one free edge portion thereof.

5. An intake system construction for an internal combustion engine according to any one of claims 1 or 2-4, further comprising a fuel injection valve fitted downstrean if said deflection valve.

6. An intake system construction for an internal combustion engine according to any one of claims 1 or 2-4, further comprising a fuel injection valve fitted upsteam of said deflection valve.

* * * * *

UNITED STATES PATENT AND TRADEMARK OFFICE
CERTIFICATE OF CORRECTION

PATENT NO. : 4,719,886
DATED : 19 January 1988
INVENTOR(S) : KOTANI et al.

It is certified that error appears in the above-identified patent and that said Letters Patent is hereby corrected as shown below:

| Column | Line | |
|---|---|---|
| Abstr. | 14 | Change "cotrol" to --control--. |
| 1 | 22 | Change "60-2504222" to --60-250422--. |
| 2 | 35 | Change "off" to --all--. |
| 3 | 37 | Change "considerably" to --considerable--. |
| 4 | 27 | Delete the "-" after "system,". |
| 5 | 25 | Change "genreally" to --generally--. |
| 7 | 20 | Change "throughhole" to --through hole--. |
| 7 | 36 | After "specified" insert --,--. |
| 9 | 56 | After "10" change "is" to --in--. |
| 9 | 62 | Change "vavle" to --valve--. |
| 10 | 18 | Change "vacumm" to --vacuum--. |
| 10 | 48 | After "axis" insert --is--. |
| 11 | 13 | Change "2" to --28--. |
| 11 | 44 | Change "win" to --in--. |
| 13 | 6 | Change "sraight" to --straight--. |

UNITED STATES PATENT AND TRADEMARK OFFICE
CERTIFICATE OF CORRECTION

PATENT NO. : 4,719,886
DATED : 19 January 1988
INVENTOR(S) : KOTANI et al.

It is certified that error appears in the above-identified patent and that said Letters Patent is hereby corrected as shown below:

| Column | Line | |
|---|---|---|
| 13 | 19 | Change "not" to --now--. |
| 13 | 65 | Change "effort" to --effect--. |
| 14 | 11 | Change "significanly" to --significantly--. |
| 16 | 14 | Change "upstram end" to --upstream ends--. |
| 16 | 36 | Change "sytem" to --system--. |

Signed and Sealed this

Twenty-eighth Day of June, 1988

Attest:

DONALD J. QUIGG

*Attesting Officer*  *Commissioner of Patents and Trademarks*